United States Patent [19]

Cantarella et al.

[11] 4,244,117
[45] * Jan. 13, 1981

[54] ELECTRONIC INCLINATION GAUGE

[75] Inventors: Robert Cantarella, 8 Green Dolphin Dr., South Burlington, Vt. 05404; Paul Tasetano, Box 41, North Ferrisburgh, Vt. 05473; George E. Strickholm, South Lincoln, Vt.

[73] Assignees: Robert Cantarella, South Burlington; Paul Tasetano, North Ferrisburg, both of Vt.

[*] Notice: The portion of the term of this patent subsequent to Sep. 18, 1996, has been disclaimed.

[21] Appl. No.: 52,480

[22] Filed: Jun. 27, 1979

Related U.S. Application Data

[63] Continuation-in-part of Ser. No. 875,094, Feb. 3, 1978, Pat. No. 4,167,818.

[51] Int. Cl.³ ............................................. G01C 9/06
[52] U.S. Cl. ..................................................... 33/366
[58] Field of Search ........................ 33/366; 200/61.47

[56] References Cited
U.S. PATENT DOCUMENTS

| 3,271,650 | 9/1966 | Riddle | 33/366 X |
| 4,138,600 | 2/1979 | Ozols | 200/61.47 |

Primary Examiner—Charles E. Phillips
Attorney, Agent, or Firm—Michael Ebert

[57] ABSTRACT

An inclination gauge that includes a bar placeable against a surface to be gauged to determine the degree to which the surface is inclined with respect to the horizontal or vertical. Mounted on the bar is a gravity-sensing potentiometer coupled to a balancing circuit to produce an analog output voltage which has a null value when the bar is placed against a perfectly horizontal or vertical surface and which has a magnitude and polarity or phase that depends on the extent and direction of the deviation from the norm when the surface being gauged is inclined. The analog voltage is converted into a corresponding digital value that is applied to a digital display. The potentiometer is formed by a circular cell partially filled with a pool of semi-conductive liquid and an electrode assembly disposed within said cell and constituted by an annular central electrode and four electrode segments concentrically arranged in quadrature relation about the central electrode, the pool partially immersing the central electrode and the lowermost two of the electrode segments, the distribution of liquid between the immersed electrode segments depending on the inclination of the bar. The electrodes of the assembly are formed of shaped wires which lie in an intermediate plane parallel to the opposing walls of the cell to minimize surface tension effects and to render the potentiometer insensitive to tilt.

4 Claims, 5 Drawing Figures

U.S. Patent  Jan. 13, 1981  4,244,117
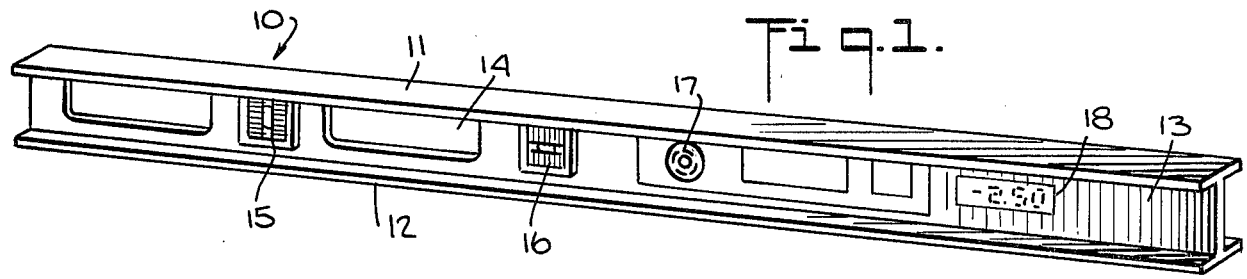
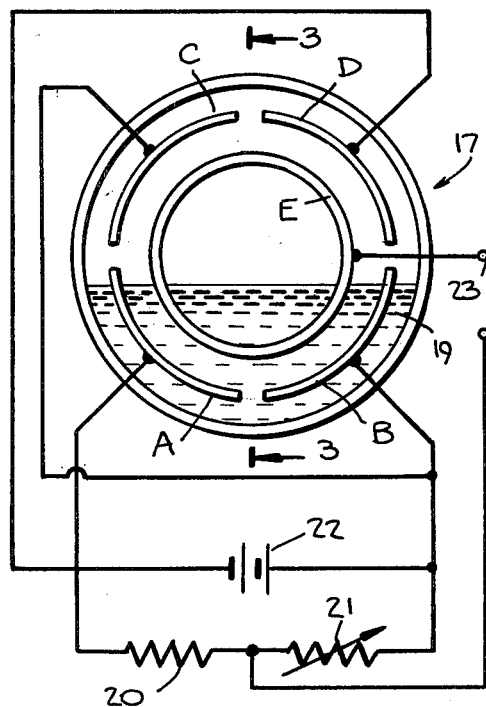
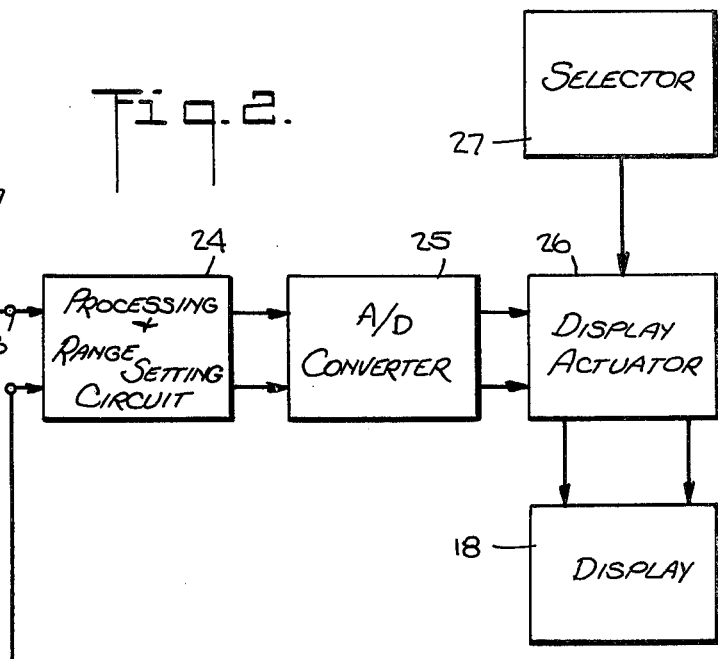
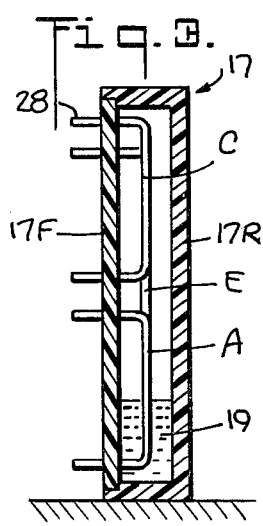
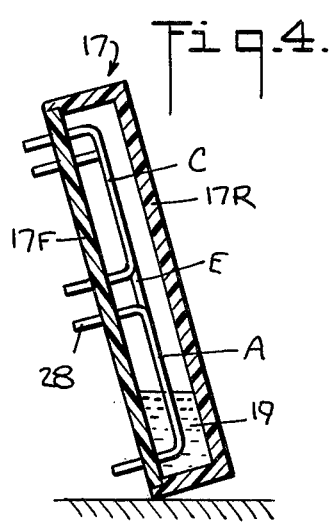
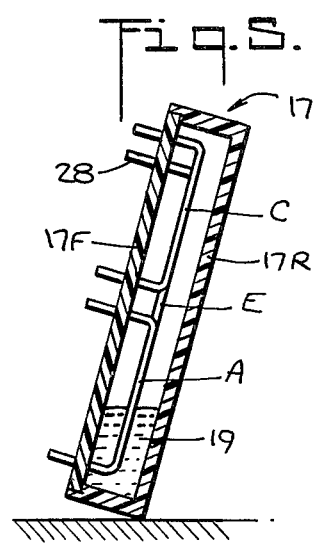

ELECTRONIC INCLINATION GAUGE

RELATED APPLICATION

This application is a continuation-in-part of the copending application Ser. No. 875,094, filed Feb. 3, 1978, now U.S. Pat. No. 4,167,818 whose entire disclosure is incorporated herein by reference.

BACKGROUND OF INVENTION

This invention relates generally to level measurement, and more particularly to an improved inclination gauge providing both a digital and an analog read-out.

As used in mechanics, level is a term referring to any direction that is at right angles to the force of gravity. Because of the earth's curvature, this direction is not precisely horizontal, but the deviation from the horizontal is negligible for short distances. The tool kit of any competent bricklayer or carpenter invariably includes a spirit level. However, the use of such levels is by no means limited to the field of construction, for this level is an essential component of many delicate physical, astronomical and engineering instruments.

Operation of the spirit level depends on the simple principle that an air bubble seeks the highest point in a container enclosing the liquid in which the bubble is formed. In a standard spirit level, the glass tube housing the liquid is either slightly curved with its convex side upward, or the tube is ground with a curved inner core.

The glass tube is supported on a rigid base or bar, and the bubble therein always comes to equilibrium at the same point whenever the bar has the same slope with respect to the horizontal plane. By providing the spirit level tube with a graduated scale, the level may be made a sensitive gauge for measuring changes in the angle of inclination.

From the practical standpoint, the value of a spirit level in providing an accurate indication of inclination depends on the ability of the user to discern the precise position of the air bubble with respect to the scale indicia on the tube. While the condition of the user's eyesight is a factor in this regard, as well as the angle at which he views the bubble, for many ordinary level applications, the fact that the readings taken by the user are somewhat inexact may not be a serious drawback; but in other situations, even a slight error cannot be tolerated.

But whether or not the user of the spirit level is capable of reading the level without difficulty, the fact is that the user, in order to obtain a correct reading, must exercise care, and this consumes time—which, in a procedure requiring frequent level readings, adds materially to the cost of the operation.

While the invention will be described in connection with an inclination gauge which supplants or supplements conventional spirit levels of the type used in the construction industry, it is to be understood that the gauge in accordance with the invention is also useful as a surveyor's level attachable to a telescope to determine differences in elevation, and in other instruments which entail the measurement of inclination.

In applicants' above-identified copending application, there is disclosed an inclination gauge having a digital readout whereby the observer, regardless of the condition of his eyesight, as long as he is able to read numbers, is given an accurate indication of inclination. This inclination also includes a spirit level components whereby the observer is given both a "coarse" spirit level analog reading and a concurrent "fine" electronic level digital reading.

The inclination gauge disclosed in this copending application includes a bar that is placeable against a surface to determine the extent to which this surface is inclined with respect to the horizontal or vertical axis. Mounted on the bar is a gravity-sensing potentiometer which is connected in a balancing circuit to produce an analog output voltage which attains a null value only when the bar is placed against a vertical or horizontal surface, and which has an amplitude and polarity or phase that depends on the extent and direction of deviation when the surface is sloped.

The analog voltage derived from the balancing circuit is applied to an analog-to-digital converter which output is fed through a display actuator to a digital display to present a reading indicating inclination in terms of angular degree or inches-per-foot. By appropriately setting the conversion factor of the digital converter a reading may be obtained in mils or radians.

Also mounted on the bar are conventional spirit level tubes, one arranged for horizontal and the other for vertical gauging, so that the user of the gauge can observe the displacement of the air bubble in each tube from a null position and thereby obtain an analog reading of the inclination, the analog and digital readings being concurrently presented on the same bar.

The practical advantage of an inclination gauge which affords both an analog and a digital readout is that the user in many situations need not check the "fine" digital reading, where it becomes immediately apparent from the "coarse" analog reading that the surface being gauged is grossly out of line. On the other hand, the fact that the analog and digital readings are concurrently available on the gauge for comparison gives the user an immediate check of any defect in the operation of the gauge.

The potentiometer, which is sensitive to inclination with respect to either the horizontal or vertical plane is formed by a circular cell partially filled with a pool of semi-conductive liquid, and an electrode assembly disposed within said cell and constituted by a disc-shaped center electrode and four electrode segments concentrically-arranged in quadrature relation about the center electrode. The pool partially immerses the center electrode and the lowermost two of said electrode segments when the bar is placed against a surface to be gauged, the distribution of liquid between the immersed electrode segments depending on inclination, the other two electrode segments being connected respectively to the immersed electrode segments.

Because of the quadrature relationship of the electrode segments, regardless of where the bar is placed, a pair of segments will always be immersed; and because of the connection between the two pairs, whichever pair is immersed will be operatively connected to the balancing circuit.

In an actual working embodiment of a gravity-sensing potentiometer of the type disclosed in the copending application, the circular cell includes a pair of opposing walls in parallel relation, and the central disc electrode and the electrode segments surrounding the disc element are fabricated from sheet metal or foil, these elements being secured to one wall of the cell.

Calibration tests conducted with potentiometers of this type indicate a margin of error of about 0.03 degrees. While this error factor in most instances is too small to be of practical significance, when greater precision is required, it is not acceptable.

We have found that this error arises mainly because of surface tension effects which cause the liquid to attain a slightly different level with respect to the electrodes of the assembly than is dictated by the existing inclination. Though one can somewhat reduce surface tension effects by the selection of a liquid having a relatively low surface tension, the liquid chosen for this purpose may lack the proper conductivity and other characteristics desirable in the gravity-sensing potentiometer.

Another factor which comes into play with regard to the accuracy of the gravity-sensing potentiometer is transverse tilt. In this regard, let us first consider a situation in which the inclination bar carrying the potentiometer is placed on a surface to be gauged which is inclined in its longitudinal axis with respect to the horizontal plane, the surface having a transverse axis which extends in the horizontal direction. In this instance, the parallel walls of the potentiometer cell will be positioned vertically, and the surface of the liquid in the cell will be horizontal and at right angles to the cell walls.

Now let us consider a second situation in which the surface to be gauged is again inclined in its longitudinal axis to the same degree as in the first situation, but in the transverse axis is now tilted or inclined with respect to the horizontal direction. In this second case, the parallel walls of the potentiometer will be tilted with respect to the vertical and the horizontal surface of the liquid in the cell will strike a different level on one wall than on the opposing wall.

Since the electrodes which sense inclination are disposed against one of the walls, the resulting reading will contain an error component; for it will not only indicate the inclination of the longitudinal axis of the surface being measured relative to the horizontal plane, but it will also reflect the transverse tilt.

SUMMARY OF INVENTION

Accordingly, the main object of this invention is to provide a gravity-sensing potentiometer for an electronic inclination gauge which minimizes surface tension effects and is insensitive to transverse tilt, whereby precise readings are obtained of inclination under all conditions.

More particularly, an object of this invention is to provide a potentiometer of the above type in which the electrode assembly within the cell is physically displaced from the front and rear walls thereof.

Also an object of the invention is to provide an accurate and reliable inclination gauge whose digital display is selectively capable of precisely indicating inclination of a surface being gauged relative to the horizontal or vertical, regardless of the tilt of the surface.

Briefly stated, these objects are attained in an inclination gauge in accordance with the invention that includes a bar that is placeable against a surface to determine the extent to which this surface is inclined with respect to the horizontal or vertical axis and to provide a readout of the deviation from the norm in both analog and in digital terms.

Mounted on the bar is a gravity-sensing potentiometer which is connected in a balancing circuit to produce an analog output voltage which attains a null value only when the bar is placed against a vertical or horizontal surface, and which has an amplitude and polarity or phase that depends on the extent and direction of deviation when the surface is sloped.

The analog voltage derived from the balancing circuit is applied to an analog-to-digital converter which output is fed through a display actuator to a digital display to present a reading indicating inclination in terms of angular degree or inches-per-foot. By appropriately setting the conversion factor of the digital converter, a reading may be obtained in mils or radians.

The gravity-sensing potentiometer is formed by a cell having parallel front and rear walls, the cell being partially filled with a pool of semi-conductive liquid. Disposed within the cell in an intermediate plane parallel to the walls thereof is an electrode assembly constituted by an annular central electrode and four electrode segments concentrically arranged in quadrature relation about the central electrode. The central electrode and the electrode segments are defined by shaped wires preferably having a circular cross section and a polished surface.

The pool partially immerses the central electrode and the lowermost two of the electrode segments when the inclination bar is placed against a surface to be gauged, the distribution of liquid between the immersed electrode segments depending on inclination. The other two electrode segments are connected respectively to the immersed electrode segments so that the gauge is operable to gauge deviations from either the horizontal or the vertical.

Because the surfaces of the electrode assembly are displaced from the walls of the cell, surface tension effects are limited to those arising between the liquid and the polished electrode wires, the surface tension effects on the walls of the cell having no significant effect on the reading. And because the electrode assembly is symmetrically disposed with respect to the opposing cell walls, errors due to transverse tilting of the cell are thereby minimized.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a dual reading inclination gauge that includes a gravity-sensing potentiometer in accordance with the invention;

FIG. 2 is a schematic diagram of the gravity-sensing potentiometer and the electronic circuit associated therewith;

FIG. 3 is a section taken through the potentiometer shown in FIG. 2 in the plane indicated by line 3—3 therein;

FIG. 4 shows the potentiometer in one condition of tilt; and

FIG. 5 shows the potentiometer in the reverse condition of tilt.

DESCRIPTION OF INVENTION

The Basic Structure

Referring now to FIG. 1, there is shown an inclination gauge in accordance with the invention which provides concurrent readings in digital and analog terms with respect to inclination of a bar 10 relative to a horizontal or a vertical axis.

Bar 10 has an I-beam formation constituted by parallel upper and lower planar flanges 11 and 12 and an interconnecting web 13. Mounted within web 13 on opposite sides of an elongated opening 14 are standard spirit level tubes 15 and 16. Tube 15 is arranged transversely relative to the longitudinal axis of the bar, whereby when the bar is placed against a vertical surface, the tube then extends horizontally and the bubble therein is at its midpoint or null position; but when the surface is inclined relative to the vertical axis, the bubble is displaced from the null to an extent and direction which represents an analog of the degree of displacement. In practice, beam 10 may be a wooden bar, a channel or a rectangular bar beam.

Spirit level tube 16 is arranged along the longitudinal axis of bar 10 so that when the bar is placed on a horizontal surface, its bubble is at null; and when the surface is inclined, the bubble is displaced accordingly. Thus spirit level tubes 15 and 16 operate in the conventional manner.

Also mounted on web 13 of the bar is a gravity-sensing potentiometer cell 17 which operates in conjunction with a balancing circuit to provide an analog voltage whose magnitude and sense reflect the deviation of the bar from either the horizontal or vertical norm. By "sense" is meant the polarity of the analog voltage in the case of d-c excitation of the potentiometer balancing circuit, and the phase of the voltage in the case of a-c excitation thereof.

Thus an inclination toward the right produces an analog voltage in one polarity or phase whose magnitude depends on the extent of deviation from the vertical or horizontal axis, and an inclination toward the left to the same extent produces a voltage of the same magnitude but of opposite polarity or phase.

The analog voltage from the potentiometer balancing circuit is processed to change its amplitude for range calibration. The analog voltage is then converted into a corresponding digital value which is applied to the actuator of a digital display 18 to provide a readout in digital terms. The number is preceded by a − or + symbol indicating the direction of inclination. The display may be of the LED or LCD type used in pocket calculators, wherein each station of the display is formed by multiple segments which, when selectively actuated, define the digits 0 to 9.

Thus the inclination gauge has an electronic and a spirit level section that concurrently present analog and digital readings of inclination with respect to the horizontal or vertical axis. The user of the gauge is given a "coarse" analog reading from which he can quickly determine the degree of deviation from the norm, and a "fine" digital reading from which he can determine the precise deviation.

The Potentiometer

Referring now to FIG. 2, there is shown an electronic inclination gauge section which includes gravity-sensing potentiometer 17. This potentiometer is in the form of a sealed circular cell partially filled with a semi-conductive liquid 19 such as alcohol. Housed within the cell is an electrode assembly constituted by an annular central electrode E, and concentrically-disposed about central electrode E are four arcuate electrode segments, A, B, C and D. Electrode segments A to D are symmetrically arranged in quadrature so that, as shown in FIG. 2, when the bar of the gauge lies in a horizontal plane, electrodes A and B are partially immersed and liquid 19 is equally distributed with respect to these electrodes.

The surface of liquid 19 is always parallel to the horizontal axis regardless of how the bar is oriented. Hence when the bar is placed on a surface $S_1$ which is inclined with respect to the horizontal axis X, the surface of the liquid remains parallel to this axis; but the orientation of segments A and B reflects the inclination. The distribution of liquid 19 is now unequal, such that more of electrode segment A is immersed than segment B.

Associated with the potentiometer is a balancing circuit which is formed by a pair of resistors 20 and 21 serially-connected between electrodes A, C and electrodes B, D to form a bridge across whose input diagonals is connected a d-c source 22, the output being yielded at terminals 23 connected to the output diagonals.

When the inclination gauge is placed against a perfectly horizontal or vertical surface, than electrode E, which behaves in a manner equivalent to a slider, is effectively at the midpoint of the potentiometer formed by the resistance path between electrode pair A and B or whichever pair is then operative with respect to the liquid pool, the resistances on either side of the slider being equal. By providing matching resistors 20 and 21, the bridge is then in balance and a null output is obtained. In practice, however, because of slight geometric asymmetries in the electrodes, small disparities in the electrode resistances may be encountered. Resistor 21 is therefore made adjustable to exactly null the bridge for a gauge placement in line with the horizontal or vertical axis.

The analog voltage at output diagonals 23 of the bridge for any given inclination has a magnitude and polarity in accordance therewith. That is to say, the amplitude of the voltage is proportional to the angle of slope and the polarity thereof is indicative of the direction of the slope.

This amplitude is adjusted by a range-setting circuit 24, which may take the form of an operational amplifier so that a given increment in amplitude represents a change of one angular degree, or whatever other span is desired. The voltage from range-setting circuit 24 is applied to an analog-to-digital converter 25 of any suitable design to produce a corresponding digital value which is applied to a display actuator 26 for controlling display 18.

Display actuator 26 is provided with a switch-operated selector 27 so that the display gives a numerical reading in angular degrees or in inches per foot, whichever is preferred by the user. Or the display may be in radians or mils.

All of the circuits associated with the gravity-sensing potentiometer can be produced in integrated circuit form; hence, in practice, an integrated circuit chip of small size may be used to minimize the space requirements of this electronic gauge section on the bar.

Because of the quadrature relationship of the segment electrodes, regardless of where the bar is placed, two of the electrodes will always be immersed. In order, therefore, to provide a gravity-sensing potentiometer which is operative for both horizontal and vertical inclinations, electrode C, as shown in FIG. 2, is connected to electrode A, and electrode D to electrode B.

The Electrode Assembly

As shown in FIG. 3, the cell of potentiometer 17 includes opposing front and rear walls 17F and 17R in parallel relation, the cell being partially filled with liquid 19.

The electrode assembly is constituted by central electrode E and electrode segments A, B, C, and D, all of which are formed by shaped wires which lie in a plane intermediate to and parallel with the front and rear walls 17F and 17R of the cell. Thus the assembly is symmetrically disposed with respect to the walls.

In practice, these wires may take the form of polished stainless steel wire of the quality used to fabricate needles, the wire being bent or shaped to assume the desired electrode configuration.

Because the electrodes are free of burrs or other roughened areas and are preferably highly polished, surface tension effects are minimized. In any case, since the electrodes are separated from the walls of the cell, whatever surface tension effects are experienced are limited to the wires themselves. By minimizing surface tension, the accuracy of the sensing potentiometer is significantly improved.

When the potentiometer is transversely tilted with respect to the horizontal, as shown in FIGS. 4 and 5, the level of the liquid 19 is different with respect to the front and rear walls of the cell. However, the critical level of the liquid which determines the output of the electrode assembly is at the midpoint between the two walls; and since the electrode assembly lies at this midpoint, the potentiometer is substantially insensitive to transverse tilt, since the midpoint level remains substantially the same regardless of the degree of tilt.

This would not be the case if the electrodes were mounted on either the front and rear walls of the cell; for then, as will be evident in FIGS. 4 and 5, the level, as seen in the cell, would depend on the transverse tilt as well as on the inclination of the surface in the longitudinal direction and would therefore include an error component.

While there has been shown and described a preferred embodiment of an improved electronic inclination gauge in accordance with the invention, it will be appreciated that many changes and modifications may be made therein without, however, departing from the essential spirit thereof.

We claim:

1. An inclination gauge comprising:
A a bar placeable against a surface inclined from a reference axis;
B circuit means including a gravity-sensing potentiometer mounted on said bar and a balancing circuit associated with said potentiometer and having an excitation voltage applied thereto to produce an analog voltage whose magnitude and sense depends on the inclination of the surface from the reference axis, said analog voltage having a null value when said surface is aligned with the reference axis; said potentiometer being formed by a cell having front and rear walls and partially filled with a pool of semi-conductive liquid, and an electrode assembly disposed within said cell intermediate said walls and constituted by an annular central electrode and at least two electrode segments on either side of said central electrode, said pool partially immersing the central electrode and said electrode segments when the bar is placed against a surface to be gauged, the distribution of liquid between the immersed electrode segments depending on inclination, the electrodes of said assembly being formed of shaped wires of good conductivity which all lie in a common plane spaced from said walls to reduce surface tension and tilting effects;
C means to convert said analog voltage to a corresponding digital value; and
D means on said bar to display said value to provide a readout of said inclination.

2. An inclination gauge comprising:
A a bar placeable against a surface inclined from a vertical or horizontal reference axis;
B circuit means including a gravity-sensing potentiometer mounted on said bar and a balancing circuit associated with said potentiometer and having an excitation voltage applied thereto to produce an analog voltage whose magnitude and sense depends on the inclination of the surface from either reference axis, said analog voltage having a null value when said surface is aligned with either the vertical or horizontal reference axis; said potentiometer being formed by a cell having parallel front and rear walls and partially filled with a pool of semiconductive liquid, and an electrode assembly disposed within said cell in a plane intermediate to and parallel with said walls and constituted by an annular central electrode and four electrode segments concentrically-arranged in quadrature relation about the central electrode, said pool partially immersing the center electrode and the lowermost two of said electrode segments when the bar is placed against a surface to be gauged, the distribution of liquid between the immersed electrode segments depending on inclination, the other two electrode segments being connected respectively to the immersed electrode segments, the electrodes of said assembly being formed of shaped wires of good conductivity which all lie in said plane to reduce surface tension and tilting effects;
C means to convert said analog voltage to a corresponding digital value; and
D means on said bar to display said value to provide a readout of said inclination.

3. A gauge as set forth in claim 1, wherein said electrode assembly is symmetrically disposed relative to said walls to minimize the effect of transverse tilting on said readout of inclination.

4. A gauge as set forth in claim 2, wherein said electrode wires are formed by stainless steel wires.

* * * * *